US006195367B1

(12) United States Patent
Jakobik et al.

(10) Patent No.: US 6,195,367 B1
(45) Date of Patent: Feb. 27, 2001

(54) ARCHITECTURAL ARRANGEMENT FOR BANDWIDTH MANAGEMENT IN LARGE CENTRAL OFFICES

(75) Inventors: Bogdan Jakobik, Nepean; Malcolm Betts, Kanata; Sarto Barsetti, Aymler; David Wright Martin; Xinyi Liu, both of Nepean, all of (CA); Mark Acton Gibbon, Bishops Stortford (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/002,036

(22) Filed: Dec. 31, 1997

(51) Int. Cl.[7] ....................................... H04J 3/02
(52) U.S. Cl. .................. 370/535; 370/420; 370/463; 370/907; 359/137; 359/139
(58) Field of Search ................... 370/216, 225, 370/228, 359, 360, 369, 380, 535, 536, 537, 538, 539, 540, 541, 542, 543, 544, 545, 419, 420, 463, 907; 359/117, 115, 123, 137, 139

(56) References Cited

U.S. PATENT DOCUMENTS

| 5,436,890 | * | 7/1995 | Read et al. ............................ 370/352 |
| 5,689,508 | * | 11/1997 | Lyles .................................... 370/391 |
| 5,781,527 | * | 7/1998 | Read et al. ............................ 370/216 |
| 5,790,519 | * | 8/1998 | Hanson et al. ....................... 370/220 |
| 5,841,760 | * | 11/1998 | Martin et al. ........................ 370/242 |
| 5,880,864 | * | 3/1999 | Williams et al. .................... 359/124 |
| 5,933,258 | * | 8/1999 | Flanagan et al. .................... 359/110 |
| 6,009,075 | * | 12/1999 | Roberts et al. ...................... 370/219 |

* cited by examiner

Primary Examiner—Seema S. Rao
Assistant Examiner—Saba Tsegaye (57) ABSTRACT

A new architectural arrangement for network elements deployed in a central office (CO) is disclosed. The architectural arrangement involves dividing the network elements into an optical layer comprised of elements that have optical signal interfaces and switch optical signals, an opto-electrical layer comprised of elements that have optical signal interfaces and switch electrical signals, and an electrical layer comprised of elements that have electrical signal interfaces and switch electrical signals. The opto-electrical layer connects the optical and the electrical layer, and also connects lower-rate optical links into the CO. This layered architectural arrangement allows for more efficient use to be made of the small number of high-rate ports supported in the optical layer, and for the off loading of switching responsibility from both the optical and the electrical layers. This, in turn, improves the overall performance and capacity of the CO. The opto-electrical layer can be implemented using known transport nodes that are only slightly modified for deployment within the CO environment.

15 Claims, 8 Drawing Sheets

ARCHITECTURAL ARRANGEMENT FOR BANDWIDTH MANAGEMENT IN LARGE CENTRAL OFFICES

FIELD OF THE INVENTION

This invention pertains generally to the field of bandwidth management in high-capacity communication networks, and particularly to the problem of managing the large amounts of bandwidth flowing through the central offices of such networks.

BACKGROUND OF THE INVENTION

Vital to any telecommunication network is the manner in which its busiest points manage great quantities of bandwidth. These points usually occur at large central offices (COs). At COs, enormous amounts of traffic must be switched between enormous numbers of possible input or output links of varying data capacities.

Space-switches are vital to achieving this function, since they interconnect the large numbers of input and output links that converge at a CO. Presently, these space-switches are typically implemented using digital cross-connect (DCS) technology. DCS switches switch signals that are in electrical form and that conform with one of a set of digital signal formatting protocols. The highest capacity signal that can be switched by a DCS switch complies with the DS3 protocol, which supports a data rate of 44.736 Mbps. DCS switches capable of supporting this maximum rate are referred to as DCS 3/3 switches, and are widely used in present large COs.

With the emergence of optical fibres as the principle transport medium for carrying telecommunication signals from point to point however, the exclusive use of DCS space-switches is becoming an undesirable means by which to space-switch large quantities of traffic within very busy COs. This is firstly because the signals sent through fibre optic media are in optical form rather than in electrical form, which means that the use of DCS switches to guide a signal from an optical input link to an optical output link mandates the conversion of many of the signals from an optical form to an electrical form for switching purposes, and then back to an optical form for transport purposes. Such conversions waste resources and add complexity to the design of the CO and its components.

A second and more important reason why the exclusive use of DCS technology is no longer suitable for deployment in busy COs, is because it has not yet been cheaply adapted to switch individual signals that are operating at rates higher than the rate supported by the DS3 protocol (44.736 Mbps). This is a problem because all optical signals comply with protocols such as the Synchronous optical Network (SONET) protocols, that call for rates many times greater than 44.736 Mbps. The limit on the per-port throughput of DCS switches means that the only way to use them to space-switch a signal between two links supporting rates greater than 44.736 Mbps is by demultiplexing the higher-rate signal down to the DS3 rate for switching purposes, switching it on existing DCS 3/3 switches at the DS3 rate, and then remultiplexing the signal back up to a higher-rate for transport purposes. Like the first problem, this mandated practice also leads to a waste of resources and increased complexity in the design of the CO and its components. Moreover, this limitation in the per-port rates supported by DCS switches means that each fibre-optics link requires tens or hundreds of cables to interface with the highest capacity DCS switch, which results in an enormous number of cables having to be laid in each CO.

Even more significantly, this limitation in the per-port rates supported by DCS switches places limits on the total bandwidth that can be managed by a CO, which relies only on DCS switches to interconnect various pieces of network elements More specifically, this limitation means that when a signal operating at a rate higher than DS3 needs to be space-switched across a DCS 3/3 switch, it must be demultiplexed into several lower-rate signals each operating at the DS3 rate. Each of these lower-rate signals require an input port and output port on the DS3-X switch. This means that many ports could be needed to connect a single high-rate link to other network elements within the CO. For example, 48 input and output DCS 3/3 ports are required to connect a single OC-48 link to other parts of the CO. Support for a plurality of such high-rate links can thus quickly lead to the utilization of all ports on an existing DS3-X space switch, which comes in sizes larger than 1000 ports by 1000 ports at a great cost, and which does not come in sizes larger than 2000 ports by 2000 ports. Once all the ports on a space-switch are utilized, no further interconnections between links that converge at a CO are possible. This in turn imposes a limit on the amount of bandwidth that can flow through the CO.

Cascading DCS 3/3 switches to form single higher-capacity space switches does not significantly alleviate this last problem, as no further increases in switching capacity are realized once more than a few switches have been interconnected. More specifically, as the number of switches comprising a single larger block of switches increases, each additional switch that is added to the block must set aside an increasing proportion of its ports just to communicate with the other switches in the block, rather than to connect new network links into the CO. At some point, the addition of an additional switch would fail to add any switching capacity to the CO, as the additional switch would have to allocate all of its ports just to communicate with the other space-switches that are already in the block. Therefore, even if deployed as interconnected groups, the use of DCS switches impose a limit on the total bandwidth that can be handled by a CO.

A solution to the problems created by the use of DCS switches is thus required. The use of electrically controlled optical signal cross-connect (OXC) switches, in which an output fibre carries the same light that entered the switch on an fibre, could eventually comprise a complete solution to the problem of managing large amounts of bandwidth at busy nodes. By switching signals in their optical forms, these switches avoid the signal conversion problems associated with DCS technology. Furthermore, because such a switch is capable of interconnecting links operating at any of the high-capacity SONET rates, it can also increase the bandwidth capacity of the CO.

At present however, problems with cross-talk, the lack of a memory function when processing optical signals, and a lack of reliability, are restricting the size of these OXC switches to 16 ports by 16 ports, and preventing them from being interconnected to form a larger switch. These restrictions are becoming unacceptable for space-switches that are to be deployed in very busy COs at which several tens of high-capacity links need to be interconnected.

Additionally, there are no known methods for performing several important bandwidth management services on optical signals, such as grooming, time-slot interchanging and performance monitoring, that are routinely performed on electrical signals. Therefore, an OXC switch by itself is not a desirable solution to the aforementioned bandwidth management problems.

Another proposed solution to these problems, involves providing optical interfaces into a DCS switch. This would internalize much of the signal processing required to electrically switch signals that arrive at and leave from the CO in optical form, within the DCS switch. It also allows for a reduction in the number of cables required to connect network elements to the DCS switch. Moreover, since the DCS switch would still switch electrical signals, the CO would still be able to support a variety of bandwidth management services.

At present however, the highest available interfaces support only the OC-12 rate. DCS switches with OC-12 interfaces are also very costly. Furthermore, this approach does not by itself address the previously described total bandwidth limitation associated with DCS technology. This is because even when DCS switches are fitted with optical interfaces, they still switch signals in a low-rate electrical format that cannot support rates exceeding 44.736 Mbps. Therefore, even if OC-12 interfaces are provided, the throughput limitation afflicting DCS switches still remains.

Another proposed solution to this problem involves using both OXC and DCS switches in each CO. It further involves distinguishing between termination traffic, which is traffic being transferred between intra-office networks and inter office networks, and hand-off traffic, which is traffic being transferred between inter-office networks. Termination traffic, which tends to require less bandwidth per connection but which also flows from a great number of local networks, would be switched through existing DCS switches. Hand-off traffic, which tends to require more bandwidth per connection, but which also comes from a smaller number of sources, would be switched through optical cross-connect switches. Splitting the traffic in this way allows the CO to better utilize both the low bandwidth per port and high number of ports that characterize DCS switches, and the high bandwidth per port and low number of ports that characterize OXC switches. In many situations however, there still will be too many sources and destinations associated with the hand-off traffic alone for even a 16×16 port OXC switch to provide all inter-office connections that must be supported at a busy CO.

The foregoing indicates that an improvement in the manner in which bandwidth is managed at COs, is still required until the capabilities of OXC-switches can be expanded.

Many high capacity transport nodes, such as SONET nodes, provide several standardized services that are also implemented on DCS switches. These include electrical space switching at the DS3 rate, time-slot assignment (hairpinning), time-slot interchange (TSI), traffic grooming (e.g. the ability of intermediate nodes to split traffic coming from a common source to two separate destinations), and performance monitoring and testing of paths, lines and sections.

In well-provisioned networks, all the COs are connected in a full or partial mesh using redundant links for protection switching purposes. Such a mesh is said to implement an alternate path of restoration service, which provides contingency routes between COs in the event of a failure in the network.

SUMMARY OF THE INVENTION

It thus is an object of this invention to provide an improved architectural arrangement for efficiently managing large quantities of bandwidth in COs. It is desirable that this arrangement not require significant investments such as those stemming from designing new products, or from the purchase of equipment that would otherwise be useless.

These and other goals are achieved by an arrangement of communications network elements at a central office (CO), comprising: an optical layer of at least one network element, the element providing optical interfaces and optical space-switching, and the optical layer providing higher-rate optical switching between other elements in the CO; an electrical layer of network elements, each element providing electrical interfaces and electrical space-switching, and the electrical layer connecting electrical links into the CO and providing electrical switching between elements in the CO; and an opto-electrical layer of network elements, each element providing optical interfaces and electrical space-switching, and the opto-electrical layer connecting optical links into the CO, and being able to aggregate signals going to the optical layer into a lower number of higher-rate optical signals and to disaggregate signals coming from the optical layer into a higher number of lower-rate signals, connected to each other such that all signals flowing between the optical and electrical layers flow through the opto-electrical layer.

Another aspect of this invention is a space-switching transport node for deployment in the central office (CO) environment, said switch being comprised of an OC-192 Synchronous Optical Network (SONET) transport node which is adapted to additionally support time-slot interchange and alternate path of restoration services, such that the node can space-switch traffic between directly connected lower-capacity SONET nodes; aggregate signals going to an optical signal cross-connect (OXC) switch into a lower number of higher-rate optical signals, and disaggregate signals coming from an OXC switch into a higher number of lower-rate signals, in exclusively providing connections between the OXC switch and other network elements within the CO.

BRIEF DESCRIPTION OF THE DRAWINGS

Embodiments of the invention will now be described with reference to the accompanying drawings, in which.

DETAILED DESCRIPTION OF THE PREFERRED EMBODIMENTS

Figure 1:
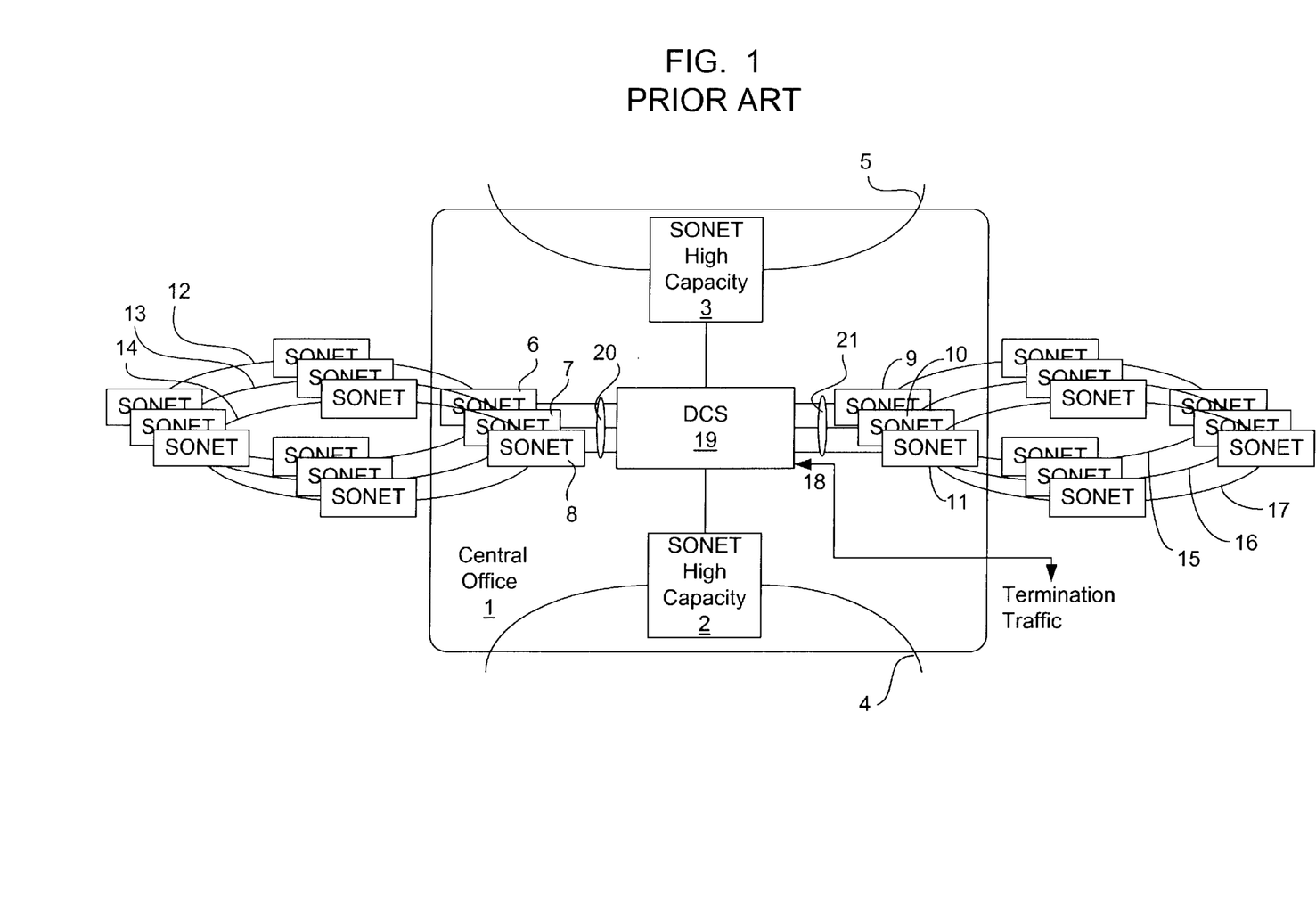
FIG. 1 illustrates a conventional arrangement of network elements deployed in a large central office (CO)

Referring firstly to FIG. 1, a conventional arrangement of network elements deployed in a large central office (CO) 1 is shown. The arrangement includes transport nodes whose primary purpose is to connect network elements outside the CO to network elements inside the CO, and space-switches whose primary purpose is to interconnect network elements within the CO. More specifically, the arrangement includes high capacity Synchronous Optical Network (SONET) transport nodes 2, 3, hereinafter referred to as express ring transport nodes, 2, 3, that connect SONET express rings 4, 5 to the CO 1. Such express rings use fibre optic links, handle traffic flowing between major urban centres, and therefore must support signals that conform with the higher level SONET protocols, such as OC-192, which is associated with a rate of about 10 Gbps. The express ring transport nodes 2, 3 are thus typically OC-192 nodes.

There also are within the CO 1 of FIG. 1, lower capacity SONET transport nodes 6 through 11, hereinafter referred to as collector ring transport nodes 6 through 11, which connect SONET collector rings 12 through 17 to the CO 1. Such collector rings 12 through 17 also use fibre optic links, handle smaller traffic flows than express rings, and typically support signals that conform with the OC-12 or OC-48 protocols which are associated with rates of 622 Mbps and 2.4 Gbps, respectively. The collector ring transport nodes 6 through 11 are thus typically OC-12 or OC-48 nodes. Links 18 to still lower-rate termination networks that lead to destination customer premises equipment (CPE), and which typically use electric signal links, can also feed into the CO 1.

Interconnecting all the collector rings 12 through 17, express rings 4, 5 and the links carrying termination traffic 18, is a digital signal cross-connect (DCS) switch 19. The DCS switch 19 is connected to the tributary sides of the transport nodes 2, 3 and 6 through 11, through sets of connections 20, 21. Under the arrangement of FIG. 1, the DCS switch 19 is responsible for switching two types of incoming traffic, namely termination traffic and hand-off traffic. Termination traffic is traffic that is flowing between a termination network and a collector or express ring. Hand-off traffic is traffic that is flowing between express and/or collector rings. As previously mentioned, the use of the DCS switch 19 to switch hand-off traffic within the CO 1 requires optical to electrical and electrical to optical signal conversion, as well as demultiplexing traffic down to a rate no higher than DS3 and then remultiplexing it back up to higher SONET transmission rates. This leads to increased architectural complexity and reduced switching performance. Furthermore, the total bandwidth capacity that can be switched by a DCS switch, or even a group of interconnected DCS switches, is limited, as described earlier.

Figure 2:
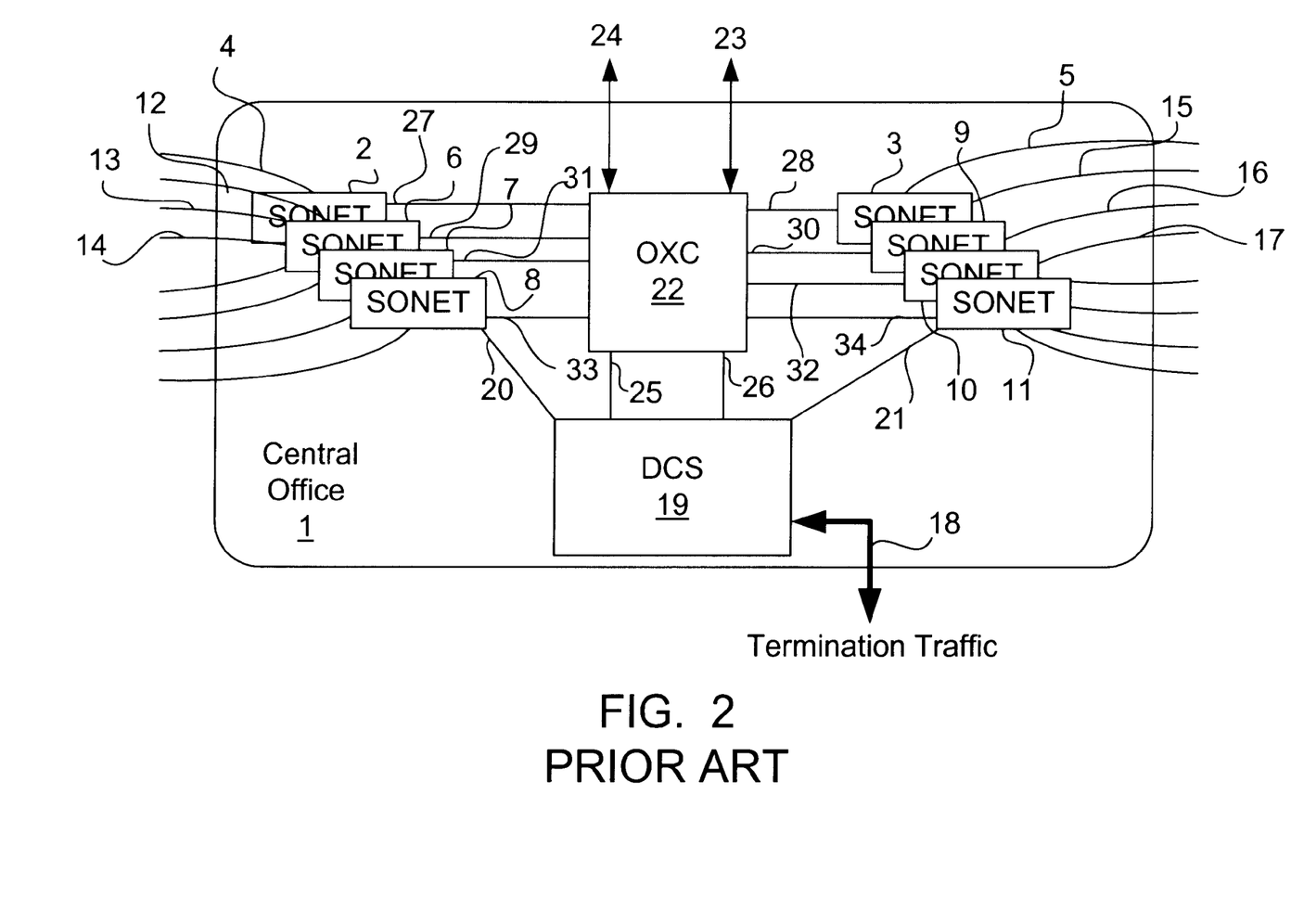
FIG. 2 illustrates how the conventional arrangement of FIG. 1 is presently being altered in order to additionally make use of an optical signal cross-connect (OXC) switch.

FIG. 2 illustrates how the conventional arrangement of FIG. 1 has recently been altered in order to make use of an optical signal cross-connect (OXC) switch 22. The express rings 4, 5 and collector rings 12 through 17 are not fully illustrated in this figure in the interests of simplicity. It will be noted that the modified CO 1 contains the same elements as the CO of FIG. 1, except for the addition of the OXC switch 22, and connections 23 through 34. As in the arrangement of FIG. 1, termination traffic can be added to or dropped from the rings through connections 20, 21. The OXC switch 22 handles hand-off traffic flowing between various express rings and collector rings. The fibre optic links 23, 24 connect the CO 1 with other COs to form a full or partial mesh that can be used to implement an alternate path of restoration service, which provides contingency routes between COs in the event of a failure in the network. Links 25, 26 connect the DCS switch 19 to the OXC switch 22. The tributary side of each nude 2, 3 and 6 through 11, is connected to the OXC switch 22 through one of the high speed optical links 27 through 34.

The arrangement of FIG. 2 involves having the OXC switch 22 handle all the hand-off traffic flowing through the CO 1 while having the DCS switch 19 handle all the termination traffic. By optically switching signals, this arrangement thus avoids the needless optical-to-electrical/electrical-to-optical conversions and multiplexing/demultiplexing of hand-off traffic introduced by the DCS switch 19 in the arrangement of FIG. 1. The arrangement of FIG. 2 also avoids the bandwidth capacity limitation problem associated with the arrangement of FIG. 1 by shifting the higher-rate hand-off traffic from the DCS switch 19 on to the OXC switch 22, which has a much higher bandwidth-capacity-per-port than the DCS switch 19. In effect, the addition of the OXC switch 22 enlarges the space-switching capability of the CO 1 without putting further demands on the DCS switch 19.

Figure 3:
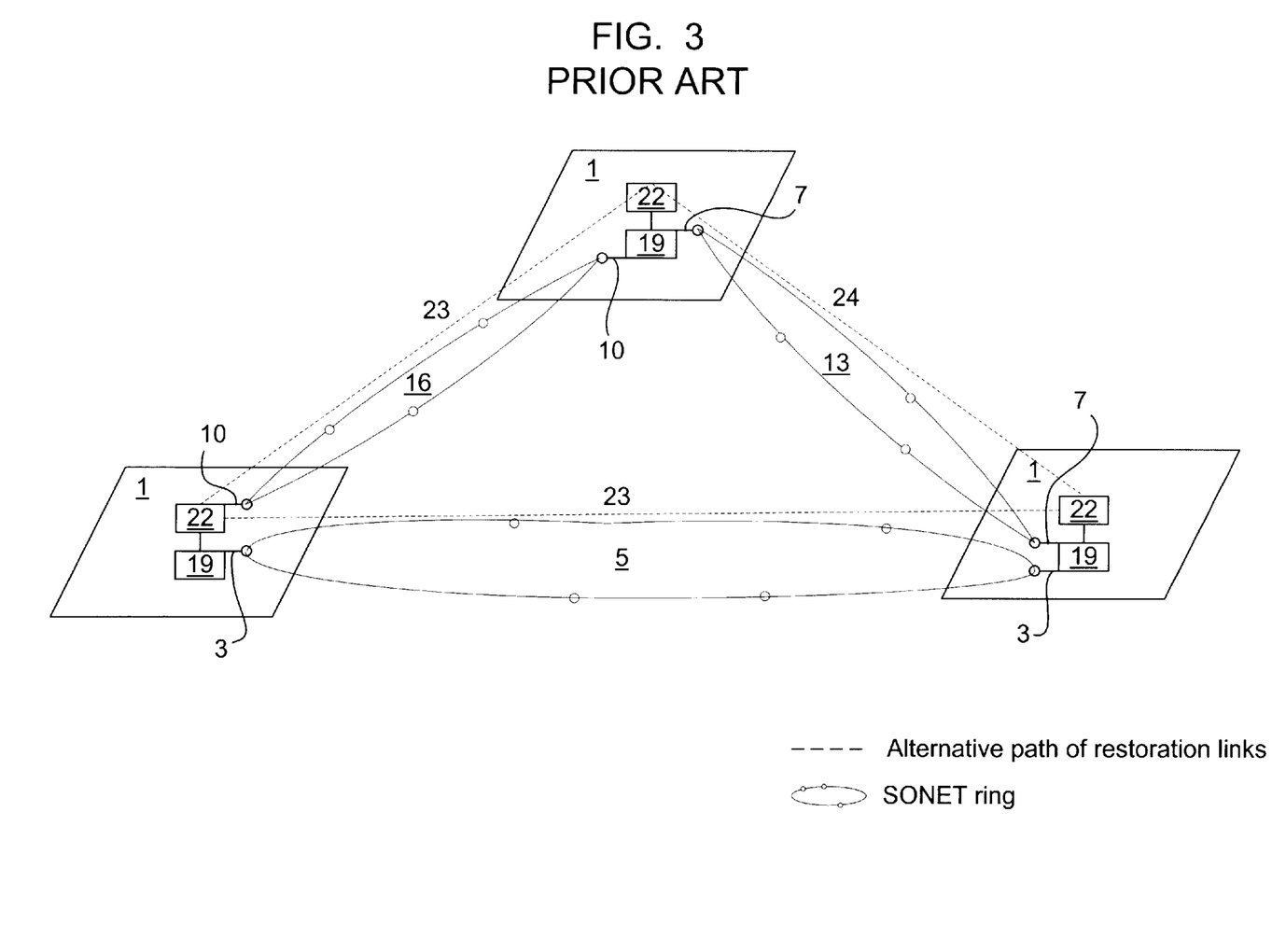
FIG. 3 illustrates the use of OXC switches to implement the alternate path of restoration service.

The use of OXC switches 22 at each CO also allows the alternate path of restoration service to be implemented using high-rate fiber optic links as shown in FIG. 3. FIG. 3 illustrates a plurality of COs 1 that each contain various network elements such as those found in FIGS. 1 and 2. It shows that the OXC switches 22 of each CO 1 can be connected in a full or partial mesh to provide the alternate path of restoration service. It is preferable that busy COs be connected within the mesh using high-rate fiber optic links 23, 24, so as to maximize the amount of traffic that can be shifted to other COs by an activated alternate path of restoration service in the event of a failure. Though high-rate links 23, 24 can be easily implemented between OXC switches, they cannot be easily implemented between DCS switches which are often operating at or near their total bandwidth capacity, since such links require a large number of DCS ports. By providing a high-rate optical port into the CO 1 for these redundant high-rate links 23, 24, the arrangement of FIG. 2 more readily provides for protection switching than the arrangement of FIG. 1.

The main problem with the arrangement of FIG. 2 however, is that the OXC 22 is required to interconnect too many nodes in a typical CO 1. Given the 16 port by 16 port limitation on the OXC switch 22 on one hand, and the very high rates supported by each port of the OXC switch 22 on the other hand, optimal use of such a switch is obtained by connecting it to a small number of high-capacity links. If the OXC switch 22 has to switch all hand-off traffic on the CO 1 however, since many of the collector ring interface nodes in a typical CO will be OC-48 nodes and OC-12 nodes sending OC-12 and OC-3 signals respectively, there will typically be more than 16 sources of hand-off traffic at busy COs. This is especially true if the alternate path of restoration is to be additionally supported. As a result, in many COs, OXC switches do not have enough ports to interconnect all the sources of hand-off traffic, while adequately provisioning the alternate path of restoration service at high rates.

Another problem with the arrangement of FIG. 2, is that the largest possible connection 25 or 26 between the DCS switch 19 and OXC switch 22 is only an OC-12 connection, since as mentioned previously, the DCS switch does not support optical interfaces operating at rates higher than the OC-12 rate. This means that if high-rate connections are desired between the OXC switch 22 and the DCS switch 19 because of a large amount of termination traffic that must be handled by the CO 1, more than one of the small number of OXC ports have to be allocated to relatively small OC-12 links, which would further exasperate the problem of there riot being enough OXC ports to interconnect all sources of hand-off traffic. Another related problem with this arrangement is the previously mentioned high cost of using OC-12 interfaces on DCS switches.

Figure 4:
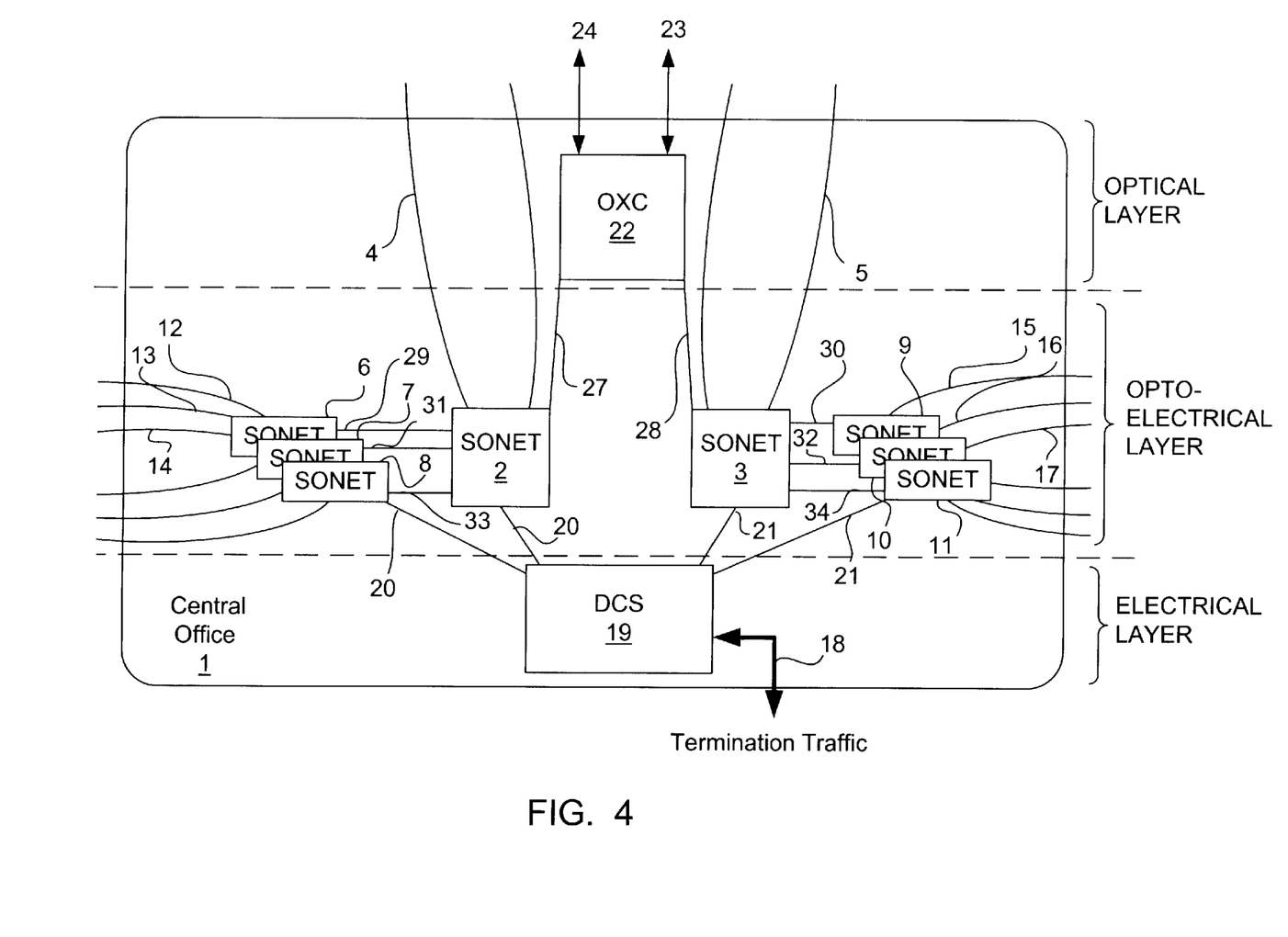
FIG. 4 illustrates an improved arrangement that is a preferred embodiment of this invention.

FIG. 4 illustrates an improved arrangement according to an embodiment of this invention, which features the same benefits as the arrangement of FIG. 2 without suffering as acutely from the same drawbacks. It is noted that FIG. 4 contains a new arrangement of the same network elements found in FIG. 2. The key difference between the arrangements is that the collector ring interface nodes 6 through 11 are connected to the OXC switch 22 through the express ring transport nodes 2, 3 instead of being directly connected to the OXC switch 22. Another difference is that the links 25, 26 between the DCS switch 19 and the OXC switch 22 have been removed.

The arrangement of FIG. 4 can be divided into three layers. An electrical layer comprises all network elements in the CO 1 with electrical signal interfaces (which all implement an electrical space-switching fabric). The layer includes the DCS switch 19 and connected interfaces to termination networks (not shown). An opto-electrical layer comprises all network elements in the CO 1 that implement optical signal interfaces, but use electrical space-switching fabrics. This layer will usually include transport nodes supporting SONET interfaces, and could additionally include a DCS switch with OC-12 or OC-3 interfaces. Finally, an optical layer comprises all network elements in the CO 1 that implement optical signal interfaces and in addition, optical space-switching fabrics. This layer will usually include the OXC switch 22.

In an embodiment of this invention, the opto-electrical layer includes the collector ring transport nodes, 6 through 11, which connect the CO 1 to the collector rings 12 through 17 as in the arrangements of FIG. 1 and FIG. 2. The opto-electrical layer also includes the express ring transport nodes 2, 3 which still serve a transport-related purpose by connecting the CO 1 to the express rings 4, 5 as in the arrangements of FIG. 1 and FIG. 2, but which now additionally serve two CO-related purposes. Firstly, these nodes 2, 3 act as an interface between the collector ring transport nodes 6 through 11 and the DCS switch 19 on one hand, and the OXC switch 22 on the other hand. Secondly, they each interconnect subsets of the attached collector ring transport nodes 6 through 8, or 9 through 11.

Under the arrangement of FIG. 4, traffic flowing through the CO 1 can be handled in the following manner. The signals carrying hand-off traffic between the express ring transport nodes 2, 3, and any signals carrying traffic between the links 23, 24 that implement the alternate path of restoration service, are switched within the CO 1 by the OXC switch 22.

Traffic flowing from collector rings 12 through 17 to one of the express rings 4, 5 is aggregated at the collector ring transport nodes 6 through 11 into higher rate optical signals which are sent to their respective local express ring transport node 2 or A. At these nodes 2, 3 the higher rate signals are themselves aggregated into still higher rate signals, and then passed to either the express ring 4 or 5 connected to the local express ring transport node 2 or 3 respectively, or the OXC switch 22 for switching to the other express ring transport node 3 or 2. Signals flowing in the opposite direction are similarly disaggregated into progressively lower-rate signals as they move from the higher-rate network elements to the lower-rate network elements.

Signals carrying termination traffic are switched between the collector rings 12 through 17 and the DCS switch 19 through direct links 20, 21 that circumvent the nodes 2, 3, though a less direct path through the express ring transport nodes 2, 3 could be used instead. Signals carrying termination traffic between the express rings 4, 5 and the DCS switch 19 can also be switched either through a series of intermediate elements in the CO, including the OXC switch 22, the nodes 2, 3 and the DCS switch 19, or directly between the nodes 2, 3 and the DCS switch 19. If termination traffic flows through intermediate nodes, a process of aggregation into a progressively smaller number of higher-rate signals takes place as traffic moves from the electrical to the optical layers, and a process of disaggregation into a progressively larger number of lower-rate signals occurs as traffic moves from the optical to the electrical layers.

Signals carrying hand-off traffic that is flowing between collector ring transport nodes that are connected to the same express ring transport node 2 or 3, such as the nodes 6, 7, 8, or the nodes 10, 11, 12 respectively, are switched through only their commonly connected express ring transport node 2 or 3 using a method that is described below.

Finally, signals carrying hand-off traffic flowing between collector rings 12 through 17 that do not interface with the same express ring transport node 2 or 3, are sent from their source collector rings through one of the nodes 2 or 3 where they are summed into higher-rate signals, then through the OXC switch 22, and finally through the other of the nodes 2 or 3 where the higher-rate signals can he disaggregated into their constituent lower rate signals and sent to their respective destination collector rings 12 through 17.

When compared with the arrangement of FIG. 2, the arrangement of FIG. 4 off-loads a significant amount of switching responsibility from the OXC switch 22 and/or the DCS switch 19, firstly by providing space-switching services for collector ring transport nodes 6 through 8, or 9 through 11, that are connected to the same express ring transport node 2 or 3. Signals flowing between such nodes can be exclusively space-switched within a CO by their common express ring transport node 2 or 3, as will be shown below, and thus do not have to be switched by either the DCS switch 19 or the OXC switch 22.

A second way in which the arrangement of FIG. 4 off-loads a significant amount of switching responsibility from the OXC switch 22 and/or the DCS switch 19, is by ensuring that only a relatively low number of high-rate optical links (with rates no lower than OC-48) are connected to the OXC switch 22, unlike the arrangement of FIG. 2 that calls for all sorts of optical links, including lower-rate OC-3 and OC-12 links, to be connected to the OXC switch 22. More specifically, routing all signals on the CO 1 destined for the OXC switch 22 through the nodes 2, 3, results in the aggregation of signals such that the OXC switch 22 can deal with a lower number of higher-rate signals. This optimal utilization of the OXC switch 22 allows the arrangement of FIG. 4 to provide all the required hand-off traffic connections, unlike the arrangement of FIG. 2.

Both these off-loading techniques allow network engineers to minimize the effects of the limit on the bandwidth capacity that afflicts DCS switches, and the limit on the number of ports that afflicts OXC switches 22. This advantage represents a significant improvement over the arrangement of FIG. 2.

Additionally, the creation of the opto-electrical layer nullifies the requirement for direct connections between the OXC switch 22 and the DCS switch 19, which nullifies the need to implement very costly OC-12 interfaces on the DCS switch, and the wasteful requirement that an OXC port handle OC-12 traffic. Traffic flowing between the optical and electrical layer can now be sent through the intermediate opto-electrical layer, and aggregated with other lower-rate optical signals for input into the OXC switch 22 through the relatively inexpensive and higher-rate optical interfaces of the express ring transport node 2 or 3.

The arrangement of FIG. 4 also yields many benefits that are not offered by the more conventional arrangement of FIG. 1. The arrangement of FIG. 4 avoids converting high-rate optical signals carrying hand-off traffic into intermediate low-rate electrical signals, by switching the signals in their optical form through the OXC 22. By the same method, the arrangement of FIG. 4 also avoids needlessly demultiplexing such signals from a high-rate format to a low-rate format, and then back up to a high-rate format. More importantly, by making use of an OXC switch that can switch any high-rate SONET-formatted signal, and by using the express ring transport node 2, 3 to aggregate signals destined for the OXC switch 22 into a smaller number of higher-rate signals that make more efficient use of the high bandwidth per port of the OXC switch 22, the arrangement of FIG. 4 can manage a greater amount of bandwidth, than the arrangement of FIG. 1.

In a preferred embodiment, an OC-192 transport node serves as the express ring transport node 2, 3. These nodes can provide space-switching between directly connected collector ring transport nodes, 6 through 11 without directly involving the DCS switch 19 or the OXC switch 22. They do this by drawing on their space-switching capabilities that would otherwise lie largely unused within the arrangement of FIG. 4, as will be shown in the following paragraphs.

The above-mentioned advantages of the arrangement of FIG. 4 are attained because of the hereuntofore unrealized ability of several specific implementations of the express ring transport nodes 2, 3, such as OC-192 transport nodes, to simultaneously fulfill transport-related functions as in the arrangements of FIG. 1 and FIG. 2, as well as CO-related functions as contemplated above.

Figure 5:
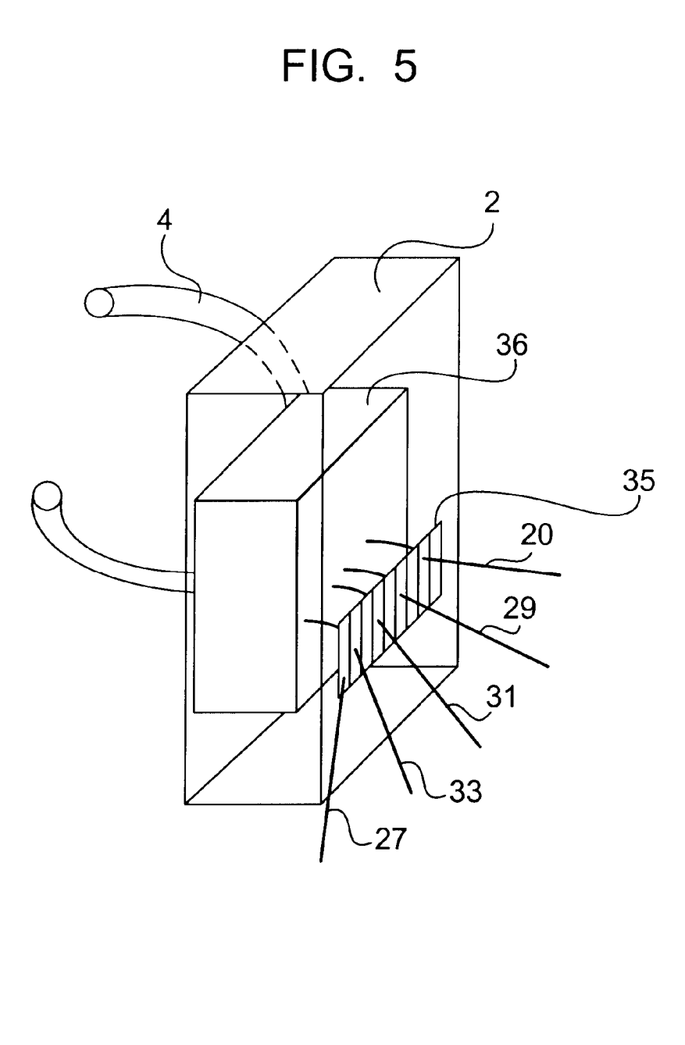
FIG. 5 shows an internal view of an OC-192 node that illustrates its space-switching capabilities.

FIG. 5 shows an internal view of an OC-192 transport node that is adapted for use as an express ring transport node 2. The OC-192 node could also be used to implement the express ring transport node 3. The figure illustrates the built-in space-switching capabilities of the OC-192 node that make it readily adaptable for use in the CO environment as contemplated in FIG. 4. Extending from one side of the node 2 is a 10 Gbps optical express ring 4. On the other side, hereinafter referred to as the tributary side of the node 2, are a group of slots for housing interface cards. Some of the slots 35 have cards with electrical interfaces that handle termination traffic going to or coming from the DCS switch 19 through links such as the link 20. The rest of the slots 35 can be used to connect in the collector ring interface nodes 6 through 8 via the links 29, 31, 33, or the OXC switch 22 via the link 27. Connecting the express ring 4, the links 20, 29, 31, 33, 27, is a DCS-switch 36 that is internal to the node 2. The internal DCS switch 36 can support at least 384×384 DS3 ports. Optical-to-electrical and electrical-to-optical conversion of signals can take place at the ingress and egress points of the space-switch 36. The space-switch 36 can thus be used, in conjunction with the time-slot assignment (also known as hair-pinning) feature that is bundled with OC-192 nodes, to switch signals between the collector ring interface nodes 6 through 8 without involving the OXC switch 22 or the DCS switch 19.

This off-loading of both the DCS switch 19 and the OXC switch 22, as mentioned previously, is a vital aspect of the opto-electrical layer.

The OC-192 space-switching capabilities illustrated in FIG. 5 also allow the node to aggregate and disaggregate traffic flowing to or from the optical layer.

Though DCS switches with optical interfaces could also act to aggregate or disaggregate traffic heading to or from the optical layer, OC-192 nodes are preferred because they offer higher rate optical interfaces than a DCS switch with optical interfaces; the former can offer optical interfaces reaching the OC-48 rate, while the latter can presently offer interfaces that only reach the OC-12 rate. This difference means that greater aggregation of traffic destined for the OXC switch 22 occurs on the OC-192 node, and therefore more efficient use can be made of the relatively small number of high bandwidth ports on the OXC switch 22.

Furthermore, the cost of an OC-192 node is presently far lower than the cost of a DCS switch with OC-12 interfaces.

Using transport nodes to fulfill CO related functions within the opto-electrical layer, instead of using a DCS switch with optical interfaces, does not require a tremendous investment of resources. Only minor modifications of OC-192 transport nodes would be required for them to assume the roles of express ring transport nodes 2, 3. More specifically, the express ring transport nodes 2, 3 can be implemented by OC-192 nodes that are programmed by software to implement the following standard services that are available on present DCS switches:

- cross-connections at the DS3 rate
- time-slot assignment (also known as hair-pinning)
- time-slot interchange
- grooming
- performance monitoring of paths, lines, sections and intermediate paths
- alternate route of restoration As of the date of the filing of this application, to the applicant's knowledge, the only services from the above list that have not yet been implemented on OC-192 nodes are the time-slot interchange service and the intermediate path performance monitoring service. It will be appreciated by those skilled in the art that programming a transport node to support either of these services can be readily achieved using known techniques. It will also be readily apparent to those skilled in the art that any programming to adapt a SONET node for deployment in the CO environment, being only a software change, can be readily undone so that the node can be deployed back in the transport environment at a later date. Largely because much of the ingenuity of this invention lies in the inventive application of the built-in capabilities of the OC-192 to the CO environment, the cost and risk associated with implementing the arrangement of FIG. 4 is low.

Because of the low cost of redeploying SONET nodes from the transport environment to the CO environment and vice versa, the implementation of the opto-electrical layer using transport nodes also gives the network engineer a very flexible tool for creating arrangements optimized for the unique requirements of each CO. Transport nodes serving CO-related purposes such as aggregating or disaggregating signals for input into OXC or DCS switches, can be easily and economically swapped with bigger or smaller transport nodes that are currently in the transport environment, to allow the capacity of the CO to be gracefully scaled. Furthermore, such a node can be deployed to strictly serve in only a CO-related capacity (i.e. such a node need not be additionally used to connect express rings into the CO). This flexibility makes a plurality of arrangements possible in each CO that are not feasible when DCS switches with optical interfaces are serving as opto-electrical nodes.

Numerous modifications and variations of the present invention are possible in light of the above teachings. It is therefore to be understood that within the scope of the appended claims, the invention may be practiced otherwise than as specifically described herein. The use of any type of transport node that performs electrical space-switching using optical interfaces in the place of the SONET transport nodes referred to herein for example, is anticipated by this invention.

Figure 6:
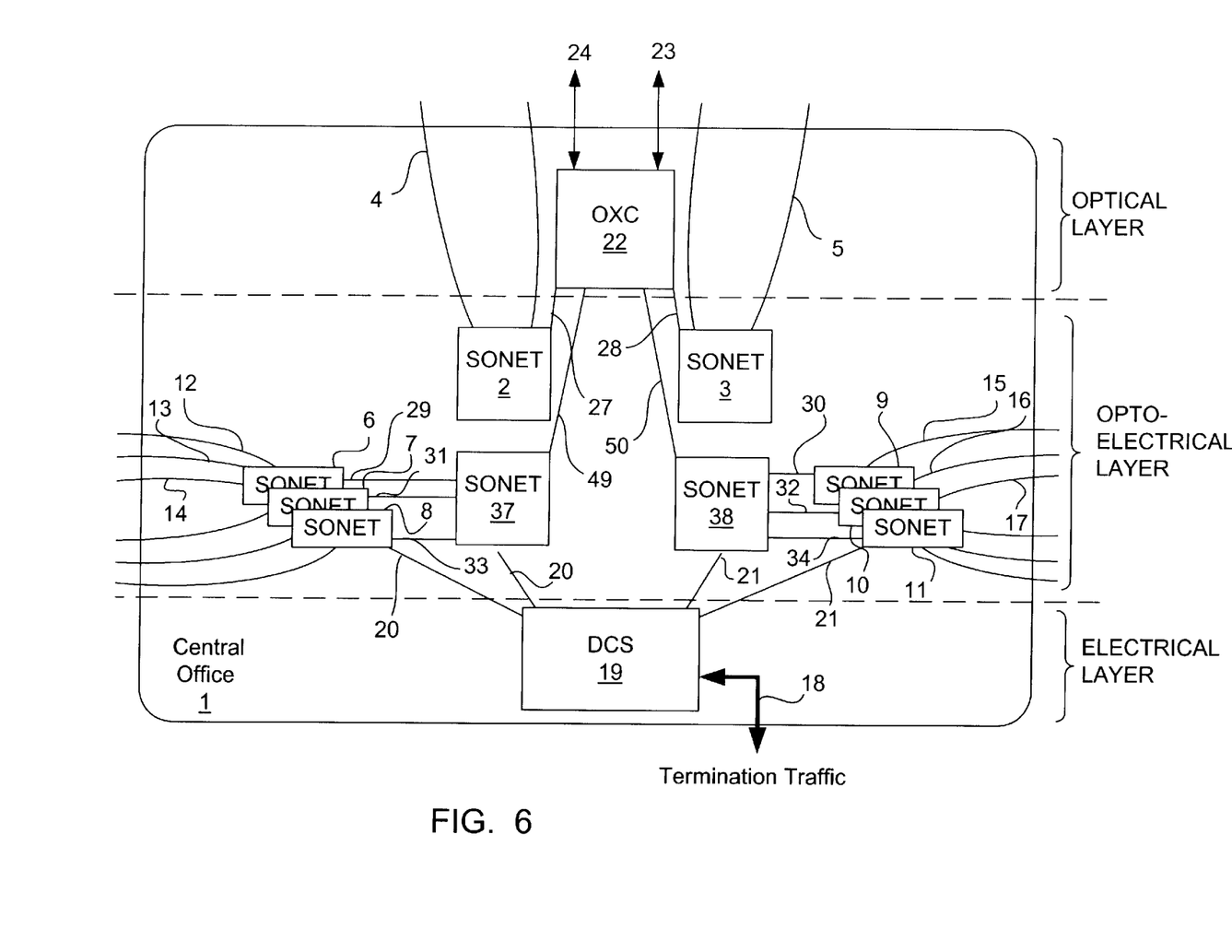
FIG. 6 illustrates a first alternative arrangement to the arrangement of FIG. 4, that is another preferred embodiment of this invention.

Any variation of FIG. 4 wherein opto-electrical nodes are interposed between the DCS switch 19 and the OXC switch 22 to aggregate or disaggregate traffic, is anticipated by this invention. Fur example, the CO-related and transport-related functions of the nodes 2, 3 in the arrangement of FIG. 4, can be provided by separate sets of nodes. Such an arrangement is illustrated in FIG. 6, wherein the nodes 37, 38 are added to the arrangement of FIG. 4 to serve the CO-related functions of the express ring transport nodes 2, 3 of FIG. 4. The nodes 37, 38 are connected to the OXC 22 via connections 49, 50. The express ring transport nodes 2, 3, which are shifted in the arrangement of FIG. 6 so that they now have their own direct links 27, 28 into the OXC switch 22, provide only the transport-related function of linking the express rings into the CO 1. This arrangement would be desirable if the express ring transport nodes 2, 3 are being overloaded with traffic under the arrangement of FIG. 4. The arrangement of FIG. 6 would also be desirable if the express ring transport nodes 2, 3 can by themselves provide the OXC switch with very high-rate signals that make efficient use of the capabilities of the OXC switch 22.

Figure 7:
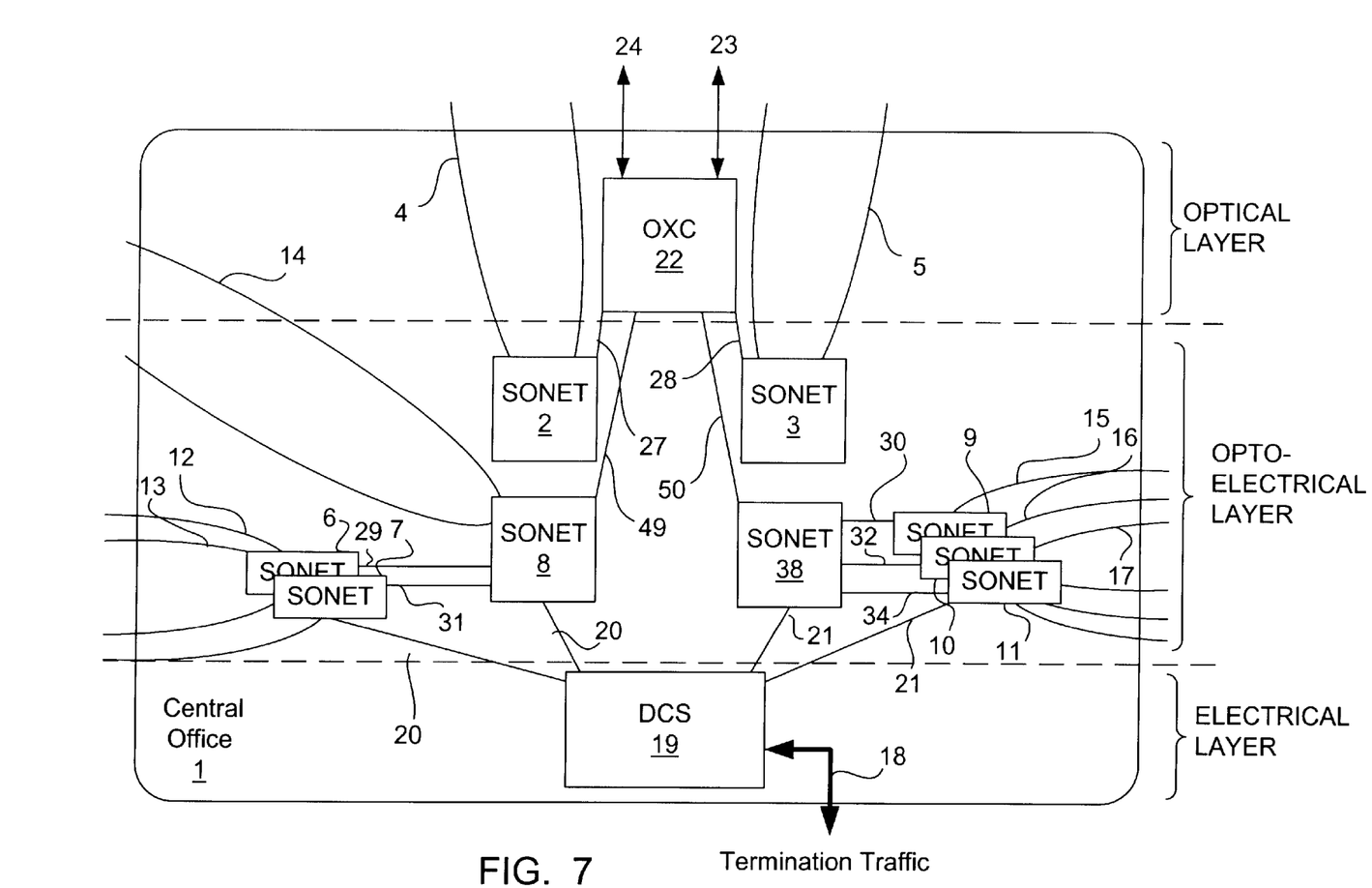
FIG. 7 illustrates a second alternative arrangement to the arrangement of FIG. 4, that is another preferred embodiment of this invention.

Other variations can be realized using this invention, to yield other sorts of benefits. For example, a further variation upon the arrangement of FIG. 6 is illustrated in FIG. 7. In FIG. 7, one of the collector ring transport nodes 8 is deployed to serve in a CO-related capacity, in addition to still serving in a transport-related capacity. The redeployment of such a node would mean that the displaced node 37 of the arrangement of FIG. 6 could be redeployed back into the transport environment, which minimizes any sunk costs resulting from implementing the new arrangement. Additionally, the newly achieved arrangement allows for a low number of cables to be used to connect the collector rings 12 through 18 to any other network elements connected to the CO 1. This is shown in FIGS. 8(a), 8(b) and 8(c), which illustrate for example, how a given set of connection-requirements between the nodes 6 through 8, and the DCS switch 19, can be implemented at a relatively lower cost in the arrangement of FIG. 7 as compared to the arrangement of FIG. 1.

Figure 8A:
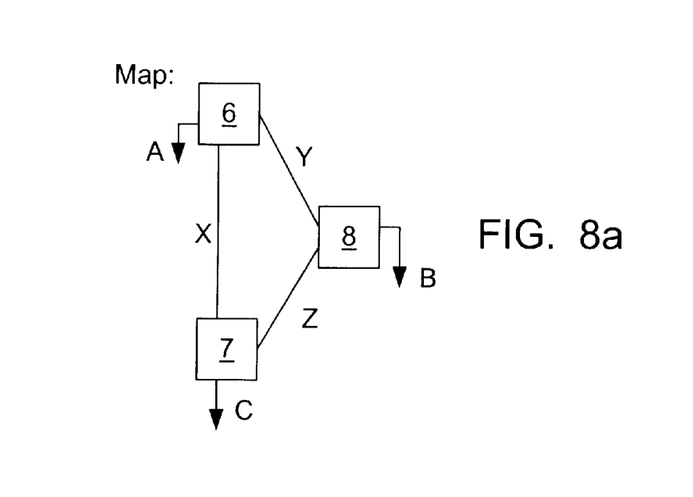
FIG. 8 illustrates how the arrangement of FIG. 7 can lead to a smaller number of links within a CO.

FIG. 8(a) is a flow diagram that schematically illustrates a given set of switching requirements for the nodes 6 through 8. Arrows leading away from one of the nodes indicate the expected flow of termination traffic between the node and the electrical layer. Thus, the node 6 is shown as needing to support a flow of traffic of A bps with the electrical layer. Lines between nodes indicate expected traffic flows between the connected nodes. Thus, the node 6 must accommodate a flow of traffic of Y bps with the node 8 and a flow of traffic of X bps with the node 7. Similar inferences can be made about the switching requirements of the other nodes 7, 8.

Figure 8B:
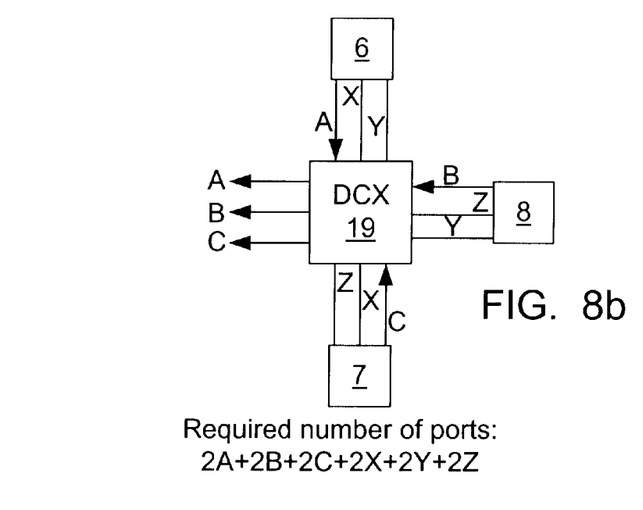

FIG. 8(b) illustrates how the arrangement of FIG. 1 satisfies these requirements by interconnecting the nodes 6 through 8 using a DCS switch 19, as would be done under the arrangement of FIG. 1. The number of ports required to implement these connections are tabulated at the bottom of FIG. 8(b), as 2A+2B+2C+2X+2Y+2Z.

Figure 8C:
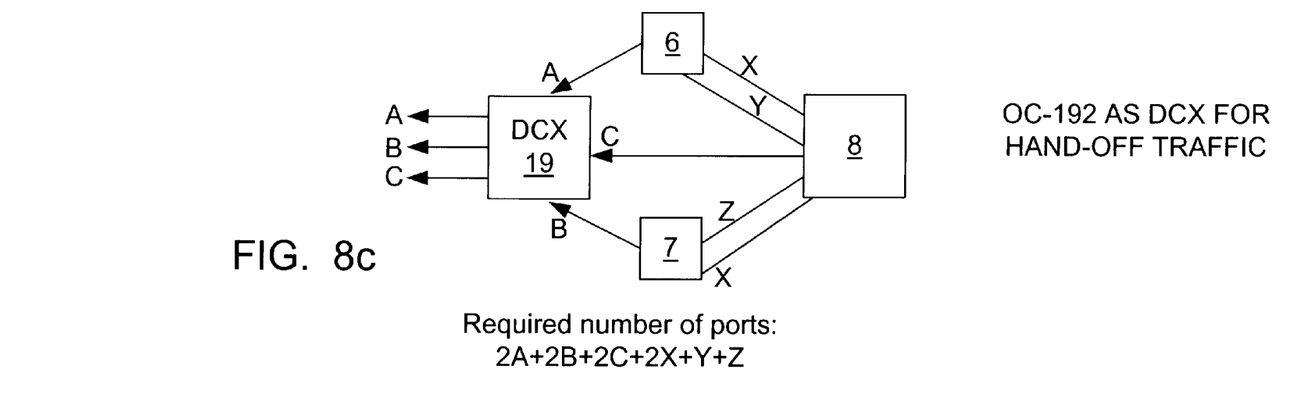

FIG. 8(c) illustrates how the arrangement of FIG. 7, wherein one of the nodes 8 is redeployed to additionally serve as an opto-electrical node and wherein all flows between the other two nodes 6 and 7 are routed through the redeployed node 8, satisfies the requirements of FIG. 8(a). The number of ports used in FIG. 8(c) to implement the required connections, which total 2A+2B+2C+2X+Y+Z, are smaller in number than those used in FIG. 8(b). The difference of Y+Z between the numbers required in FIGS. 8 (b) and 8 (c), represents a significant saving in the cabling and complexity of the CO, even in this small localized example. Far more significant savings can be illustrated using more complicated examples.

It is noted that such rearrangements are far more difficult and costly to achieve if DCS switches with optical interfaces are used to implement CO-related functions within the opto-electrical layer. Such switches are not as easily interchangeable with equipment in the transport environment. Additionally, such switches do not support the same variety of optical interfaces.

We claim:

1. An arrangement of communications network elements at a central office (CO), comprising:
    an optical layer of at least one network element, the element providing optical interfaces and optical space-switching, and the optical layer providing higher-rate optical switching between other elements in the CO;
    an electrical layer of network elements, each element providing electrical interfaces and electrical space-switching, and the electrical layer connecting electrical links into the CO and providing electrical switching between elements in the CO; and
    an opto-electrical layer of network elements, each element providing optical interfaces and electrical space-switching, and the opto-electrical layer connecting optical links into the CO, and being able to aggregate signals going to the optical layer into a lower number of higher-rate optical signals and to disaggregate signals coming from the optical layer into a higher number of lower-rate signals, connected to each other such that all signals flowing between the optical and electrical layers flow through the opto-electrical layer,
    wherein the network elements in the opto-electrical layer are divided into at least one group, and the network elements comprising each group are all connected to a common node within that group such that the common node is the only node that is directly connected to the optical layer, and signals flowing from one node in that group to another node in that same group can be switched within the common node without going through either the optical or electrical layers.

2. The arrangement of claim 1, wherein the network elements of the opto-electrical layer are Synchronous Optical Network (SONET) transport nodes.

3. The arrangement of claim 2 wherein at least one of the SONET transport nodes is an OC-192 node that is modified by programming it to additionally implement the time-slot interchange service and the intermediate path monitoring service.

4. The arrangement of claim 3 wherein the opto-electrical layer additionally provides electrical space-switching between its own elements using the modified node.

5. The arrangement of claim 1 wherein the common node is an OC-192 transport node.

6. The arrangement of claim 1 wherein a signal flowing from a transport node within a first group to a destination transport node within another group is aggregated with other signals into a higher-rate signal at the common node of the first group, sent as part of the higher-rate signal to the optical layer and then to the common node of the other group, disaggregated from the other signals comprising the higher-rate signal, and then sent from the other group's common node to the destination transport node for transmission from the CO.

7. The arrangement of claim 1 wherein the opto-electrical layer includes at least one transport node that does not connect optical links into the CO.

8. The arrangement of claim 1 wherein the electrical layer includes at least one digital signal cross-connect (DCS) switch.

9. The arrangement of claim 1 wherein the optical layer is implemented by one optical signal cross-connect (OXC) switch.

10. The arrangement of claim 1 wherein the network elements within the optical layer additionally connect optical protection-switching links into the CO, such that several COs are connected in a mesh in order to implement an alternate path of restoration service.

11. The arrangement of claim 10 wherein a full mesh is used.

12. The arrangement of claim 10 wherein a partial mesh is used.

13. The arrangement of claim 1 wherein the higher-rate optical switching provided by the optical layer operates at rates greater than or equal to the OC-48 rate.

14. An arrangement of communications network elements for interconnecting a large number of input and output links that converge at a central office (CO) comprising at least one set of transport nodes that connects optical links into the CO, said set being connected to both a digital signal cross-connect (DCS) switch that links electrical links into the CO, and an optical signal cross-connect (OXC) switch that provides high-rate connections between any sets of transport nodes in the CO, and wherein each set is comprised of a plurality of Synchronous Optical Network (SONET) transport nodes interconnected such that there is within each set a common node that is connected to all the other nodes within the set and to the OXC switch, and such that none of the other nodes within the set are connected to the OXC switch.

15. The arrangement of claim 14 wherein the common node is an OC-192 node and the other nodes in the set are lower rate SONET nodes.

* * * * *